June 20, 1950   W. H. WAIT ET AL   2,512,188
OUTLET BOX SUPPORT
Filed April 1, 1947
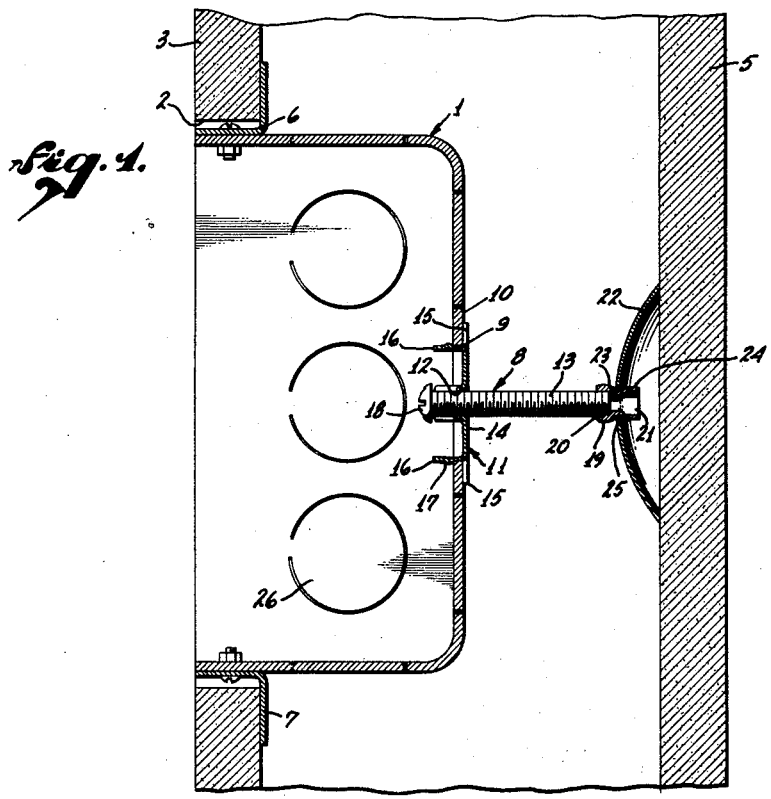
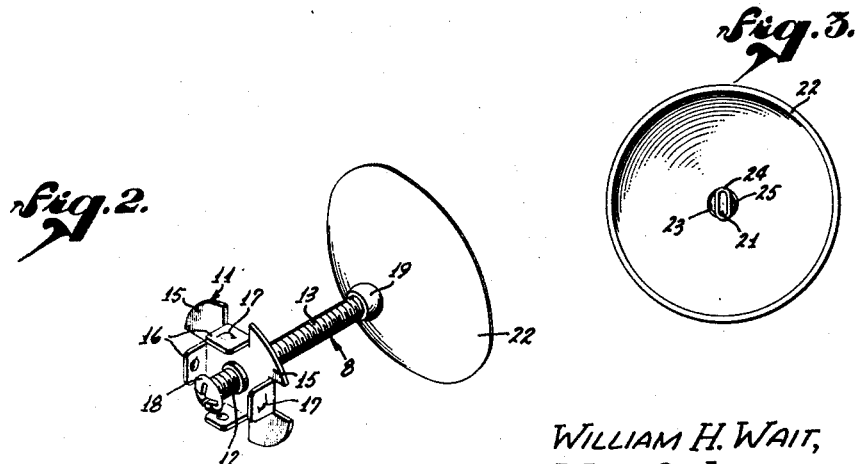
WILLIAM H. WAIT,
WILL C. JORDAN,
INVENTORS.
BY [signature]
ATTORNEY.

Patented June 20, 1950

2,512,188

UNITED STATES PATENT OFFICE 2,512,188

OUTLET BOX SUPPORT

William H. Wait and Will Claude Jordan, Burbank, Calif.

Application April 1, 1947, Serial No. 738,666

4 Claims. (Cl. 248—205)

1

The invention relates to an outlet box support and more particularly to an electrical outlet box especially adapted for installation in buildings already completed.

The usual type of outlet box to be installed in a side wall has upper and lower outwardly extending ears or flanges having openings to receive screws which hold the box in the wall opening. This manner of supporting the outlet box in a completed building takes considerable time and is frequently unsatisfactory for the reason that the screws for holding the box in position do not find a sufficient anchor in the plaster or plaster-like material of the front wall.

An object of the invention is to support the outlet box in position without the use of such screws. This is accomplished by providing a spreader clamp for bracing the box in position between the back wall and the front wall of the wall space. The clamp is preferably in the form of an attachment which can be readily mounted in the central knockout opening in the back wall of the box, and the clamp has an operating member such as a single bolt accessible at the front of the box. The outwardly extending flanges on the box are left in the same position as for installation in a building then being constructed, namely with ⅞" clearance between the front of the box and the flanges or ears. According to the invention, no screws are used in the flanges or ears and instead, the flanges face forwardly to bear against the inside of the wall around the front wall opening and serve as thrust members to limit the forward thrust of the box when the clamp is extended. Hence, it is simply necessary to screw in one bolt in order to clamp the outlet box in position, as screws are not used in the flanges or ears. The outlet box and the spreader clamp thus form a strut-like member to brace or support the front and back walls against compression.

For further details of the invention, reference may be made to the drawings wherein Fig. 1 is a vertical sectional view of a conventional type of outlet box in the wall opening of a wall space, the box having a spreader clamp according to the present invention.

Fig. 2 is a perspective view of the spreader clamp of Fig. 1.

Fig. 3 is an end view in elevation of the brace or footpiece of the clamp which thrusts against the back wall.

Referring to the drawings, a conventional outlet box 1 is illustrated in the opening 2 of the front wall 3 of a wall space having a back wall 5.

The outlet box 1 is rectangular and has inwardly extending upper and lower lugs, not shown, to receive machine screws to hold the receptacle or switch not shown, and the receptacle or switch has threaded apertures to receive bolts to hold a cover on the box as well-known and not illustrated.

When the box 1 is to be mounted in a building under construction, the usual flanges or ears 6 and 7 are in the position shown, to leave a space of ⅞" for the lath and plaster. In that case, screws are inserted through the ears to fasten them to a block behind the ears. According to the present invention, the ears 6 and 7 are left in the position shown in Fig. 1, without employing any screws through the ears 6 and 7. According to usual practice, if the box 1 were to be mounted in an old building, the ears 6 and 7 would be reversed in position to bring them flush with the front of the box and screws would be inserted through such ears to fasten them to the old plaster, which is unsatisfactory as above explained.

The invention provides a spreader clamp 8 to hold the box 1 in position by bracing it or clamping it in position between the back wall 5 and the inside of the front wall 3. The clamp 8 is in the form of an attachment which is readily mounted in and supported by the usual central circular knockout opening 9 in the rear wall 10 of the box. The clamp 8 is operable from the front of the box.

The clamp 8 comprises a clamp and coupling member 11 which is a sheet metal stamping having a central threaded aperture 12 to receive a bolt 13. The body 14 of the stamping has a plurality here shown as four radially extending and spaced portions such as indicated at 15, each having a greater radius than the radius of opening 9 whereby such portions 15 thrust against the outside of the rear wall 10 around the opening 9. Interspersed with the four radial portions 15 are four lugs bent from the sheet body 14, one of the lugs being indicated at 16. The four lugs like lug 16 comprises a circular array having a diameter to fit the opening 9. The lugs 16 in being of sheet metal are somewhat spring-like and each thereof has a locking lug 17, the lug 17 engaging the rim of hole 9 at the inside of the back wall 10 to hold the coupling 11 in position in the hole 9 and thereby support the clamp 8 on and extending from the rear wall 10. The head 18 of the bolt 13 is arranged on the same side of the coupling 11 as the lug 16 so that the bolt head 18 is accessible at the front of the box 1. Mounted on the outer end of the bolt 13 is a fitting 19 having a threaded socket 20 to receive the threads on the bolt 13. The outer end of the coupling 19 is tubular as indicated at 21 to receive a brace or footpiece 22 here shown as a shallow sheet metal cup which serves as a clamp member. The brace 22 has a central aperture 23 to receive the tube 21 and after the brace 22 is mounted on the fitting as shown in Fig. 1, the tube 21 is upset as indicated at 24 to prevent the brace 22 from sliding off from the fitting. The opposite ends of the fitting 19 are larger than the opening 23 and the opening 23 is larger than the intermediate portion 25 of the fitting, to loosely support the brace 22 with a swivel connection and to permit it to tilt with respect to the bolt 13 and form a firm footing on the back wall 5.

In the use of the device, the electrical cable, not shown, is brought through one of the knockouts, such as 26, with the box 1 in front of the front wall 3. The spreader clamp 8 is mounted on the rear wall 10 of the box by pushing the lugs 16 of the coupling and clamp member 11 into the opening 9, the ears 6 and 7 being in position shown in Fig. 1. The box 1 is tilted at an angle to pass it through the opening 2 and it is adjusted to bring the box somewhat to the position shown in Fig. 1 with the ears 6 and 7 behind the front wall 3. A screw driver is then applied to the bolt head 18 to screw in the bolt 13, to spread the brace 22 and the coupling and clamp member 11 until the brace 22 bears against the back wall 5 with lugs 15 thrusting against the rear wall 10 and with the ears 6 and 7 thrusting against the front wall. The box 1 is thus held in position by the single bolt 13 without the use of the usual screws in the ears 6 and 7. The box 1 is then wired to a switch or the like as usual. The overall length of the brace 22 to the shoulder on the bolt head 18 is preferably about 1¾" and is such that a standard outlet box 1 and with the usual building wall construction, when the bolt 13 is screwed home, it will only project about ¼" or ⅜" into box 1, thereby leaving plenty of room for the switch or receptacle.

Various modifications may be made in the invention without departing from the spirit of the following claims. For example, bolts or screws such as indicated at 13, of different lengths may be used to suit the requirement of outlet boxes of different depth and wall spaces of different depth. Also, not all outlet boxes have a central opening as shown in Fig. 1 but instead has one or more openings at one side of the center, and the clamp of this invention, of course, may be used in any such opening, whether central or otherwise.

We claim:

1. An outlet box support comprising a spreader clamp for strutting the front and back walls of a wall space with said clamp and said box, said clamp having fastening means engageable with the rim of a knock out opening in the rear wall of the box.

2. Means for supporting an outlet box between the front and back walls of a wall space and in an opening in the front wall, said outlet box having a rear wall having an opening, and said outlet box having means engageable with the front wall to resist forward thrust of said outlet box, said first means comprising a coupling fitting in said opening, said coupling having means for mounting the same in said box opening, said coupling having a lateral extension to bear against the outside of said rear wall, a bolt having threaded engagement with said coupling, said bolt having a head accessible from the front of said coupling at the front of the outlet box, and a brace on the outer end of said bolt engageable with the back wall, said bolt comprising means for spreading said coupling and said brace apart.

3. An attachment for an outlet box having a circular knockout opening in its rear wall, said attachment comprising a spreader clamp having a sheet metal member having a bore having threads, said member having on one side thereof a circular array of spaced locking lugs adapted to fit in said opening, said member having, interspersed with said lugs, spaced radial portions of greater radius than the radius of said lugs, a bolt in said bore having a head on the same side of said member as said lugs, a fitting having threads for the outer end of said bolt, and a sheet metal brace loosely mounted on said fitting.

4. An attachment of an outlet box having a rear wall having a knock out opening, said attachment comprising a spreader clamp having relatively extensible members to brace against the rear wall of a wall space and thrust the box forwardly, and means for mounting said forwardly thrusting member in said opening, said members having an operating bolt having a head accessible at the front of said box, said mounting means comprising a flange on said forwardly thrusting member to bear against the outside of the rear wall of the box and cooperating fastening lugs engageable with the rim of said opening, said bolt having threaded engagement with said forwardly thrusting member, and a swivel connection between said other member and said bolt.

WILLIAM H. WAIT.
WILL CLAUDE JORDAN.

REFERENCES CITED

The following references are of record in the file of this patent:

UNITED STATES PATENTS

| Number | Name | Date |
|---|---|---|
| 1,453,017 | Lindelof | Apr. 24, 1923 |
| 1,567,863 | Sargent et al. | Dec. 29, 1925 |
| 2,423,757 | Dedge | July 8, 1947 |